Feb. 14, 1961 L. B. KYLE 2,971,290
SEED BED OPERATION IN HYDROPONIC SYSTEMS
Filed July 11, 1957 2 Sheets-Sheet 1
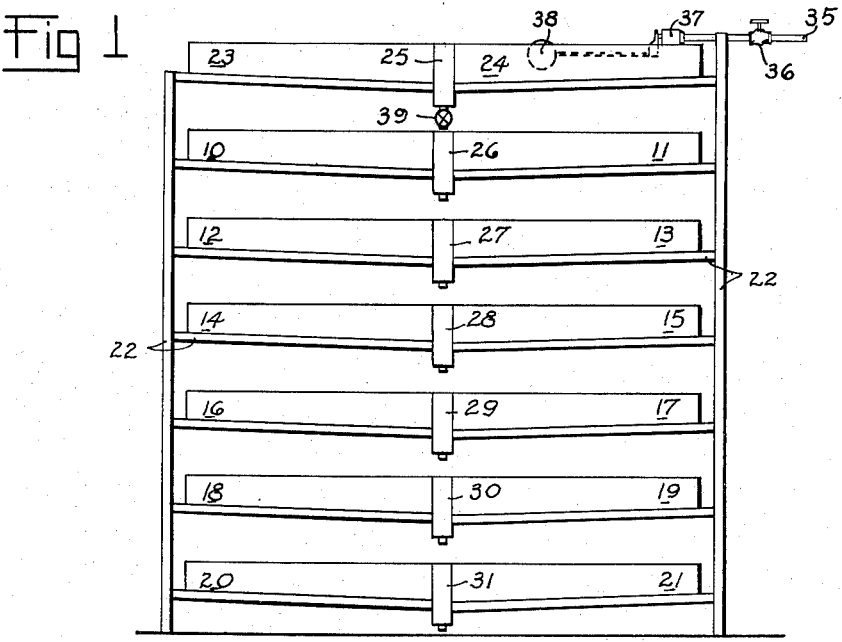
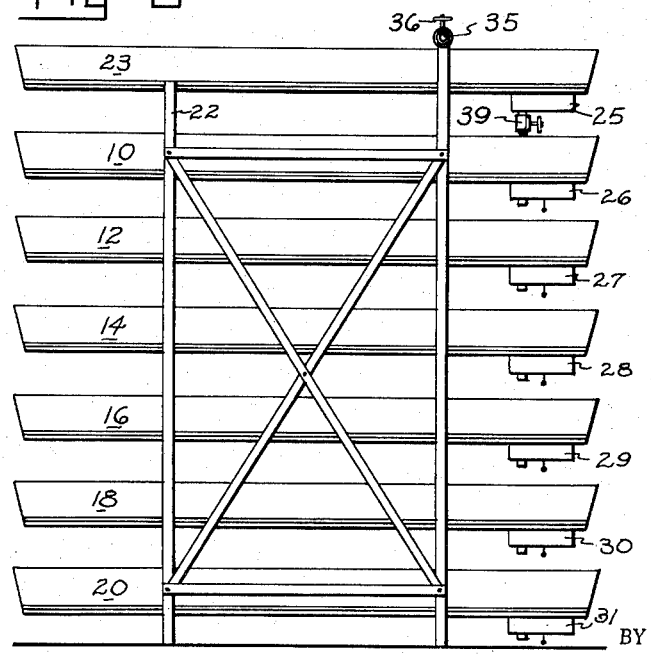
Leslie B. Kyle
INVENTOR.

Feb. 14, 1961 L. B. KYLE 2,971,290
SEED BED OPERATION IN HYDROPONIC SYSTEMS
Filed July 11, 1957 2 Sheets-Sheet 2
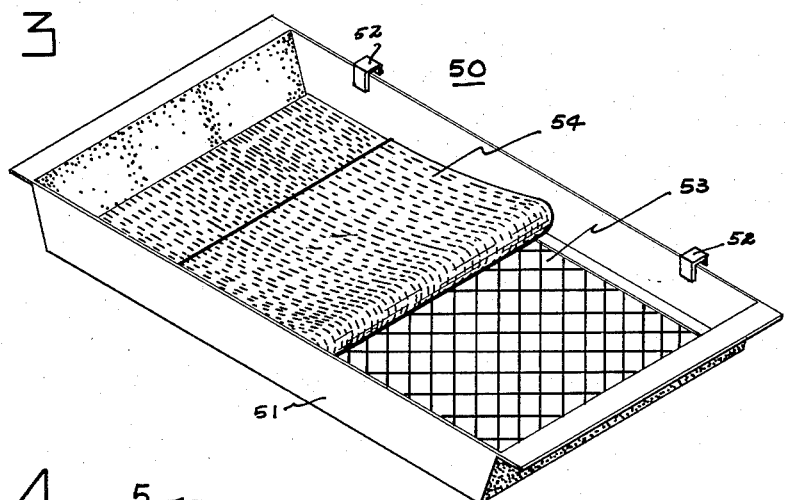
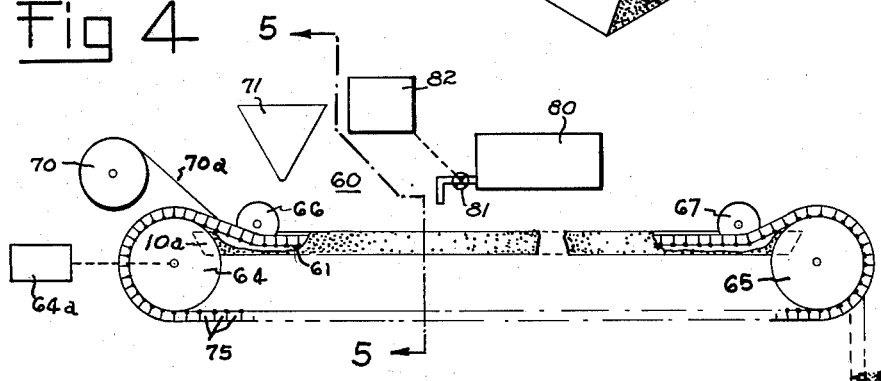
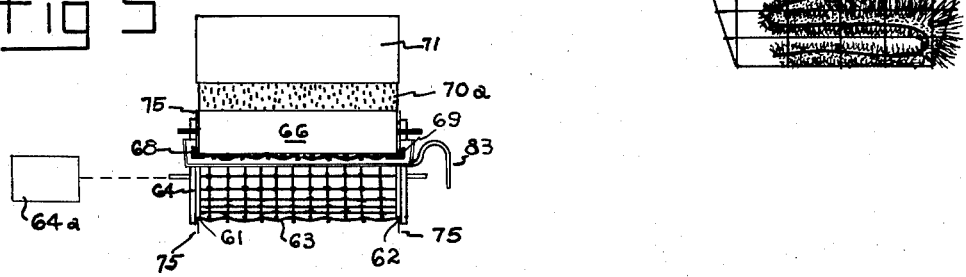
LESLIE B. KYLE
INVENTOR.

United States Patent Office 2,971,290
Patented Feb. 14, 1961

2,971,290
SEED BED OPERATION IN HYDROPONIC SYSTEMS

Leslie B. Kyle, Dallas, Tex., assignor to Hydroponics, Incorporated, Indianapolis, Ind., a corporation of Indiana Filed July 11, 1957, Ser. No. 671,180

7 Claims. (Cl. 47—1.2)

This invention relates to hydroponic cultivation of plants wherein germination and growth are stimulated under controlled soilless nutrition and environment, and more particularly to a method and system for initiating a culture and for removing a crop produced by intermittent flow thereover of a nutrient laden fluid.

Several systems have been developed for promoting soilless cultivation of plants which, in general, are characterized by disposal of a bed of seeds in a zone through which a liquid periodically is caused to flow while carrying in solution the necessary plant nutrients. Several seed bearing trays forming such zones stacked in tiers, one above another, have been employed to permit unit operation. In such a unit a common nutrient stream is caused to flow successively from a top culture tray to lower culture tray before discharge thereof.

Each culture tray ordinarily is provided with a mesh bottom of such size that seeds would not pass therethrough. Roots, when formed, extend downward through the screen forming a compact mat. As a result, when such a tray is to be unloaded, considerable effort is required to dislodge the roots from the mesh.

In accordance with the present invention a new and wholly satisfactory seed bed is provided wherein transfer or removal of a culture at harvest time comparatively is effortless. More particularly an edible support is provided which becomes integrated in the culture as to form a nutrient vehicle and/or a mere seed bed support.

Thus in accordance with the present invention a hydroponic culture system is provided with a seed bed support comprising a culture tray in which the bottom is formed as a primary support having openings therein which are large compared with the size of the seeds. A secondary support is provided characterized by a membrane in which perforations of size which is small compared to that of the seed permit root development therethrough, and extraction of the culture as a unit without being enmeshed in the primary support. The secondary support is edible and may provide a vehicle for food supplement.

For further objects and advantages of the invention and for a more complete understanding thereof reference may now be had to the following description taken in conjunction with the accompanying drawings in which:

Fig. 1 is a front view of a tiered hydroponic culture system;

Fig. 2 is a side view of said system;

Fig. 3 is a diagrammatic view of a seed basket;

Fig. 4 is a side view of a continuous culture system; and

Fig. 5 is a sectional view taken along line 5—5 of Fig. 4.

Referring now to Fig. 1 there is illustrated a hydroponic culture system in which twelve culture zones or trays 10–21 are disposed in tiers and supported on a frame 22. Two additional trays, 23 and 24, are provided to form reservoirs for nutrient fluid and are positioned above the culture trays 10–21 at the top of the frame 22.

Each of the trays preferably has a bottom surface sloping downward toward the center of the frame 16. A drain well or siphon box is provided intermediate each pair of trays. More particularly box 25 is located between trays 23 and 24. A second box 26 is located immediately below box 25 and intermediate trays 10 and 11. Similarly boxes 27–31 are located in tiers respectively intermediate the successively lower pairs of trays 12–21.

A fluid inlet pipe 35 connected to a suitable water supply is connected through manual valve 36 and valve 37 actuated by float 38 to a faucet which discharges into the reservoirs formed by the upper pair of trays 23 and 24. A manual valve 39 is provided at the bottom of box or well 25. The drain wells such as well 25 provide a fluid coupling between adjacent trays 23 and 24.

Referring to Fig. 2 it will be seen that each individual tray such as trays 23 and 24 are rectangular in shape and rest upon partition members provided in frame 22. In one embodiment each tray was of the order of 7 feet long, 3 feet wide, and about 5 inches deep. The trays were arrayed one above the other and spaced about 13 inches on centers, thereby providing suitable space for plan growth in each culture zone.

In practice several seed baskets loaded with seeds, such as oats, are placed in each of trays 10–21. Such seeds are prepared by first soaking them in water for about six hours and then by permitting them to drain and germinate for 24 hours. Seed baskets, when loaded, are placed in the trays 10–21 and subjected to a program of irrigation with nutrient laden water, preferably in an atmosphere wherein temperatures are maintained between 60° and 80° F. The bottom of the seed bed in each basket is spaced from the bottom of the associated culture zone or tray about 1 to 2 inches, more or less, to permit root development.

With valve 39 closed and valve 36 open, reservoirs 23 and 24 will be filled to the level permitted by float 38 which controls valve 37. In the system above described 80 gallons of water are used. A suitable nutrient chemical is then added to the water in reservoirs 23 and 24. An irrigation operation is then initiated by opening valve 39. The feed water is then transferred, as by siphoning, to well 26 and trays 10 and 11. After remaining in trays 10 and 11 for a predetermined interval, the feed water is transferred to well 27 and trays 12 and 13 and then successively through the entire culture system preferably in the manner described and claimed in copending application Serial No. 639,457 of Richard S. Carter, entitled Nutrient Fluid Control in Hydroponic Systems, now Patent 2,940,218, June 14, 1960. Such irrigation cycle is repeated at intervals as well understood by those skilled in the art. At the end of six days, growth in a given zone will exceed 6 inches and will comprise a solid mat of greenery with the sprouted seeds forming a solid body having roots extending therebelow. The next step then is to remove the culture from the seed basket and utilize the same as animal feed.

Seed baskets ordinarily used have been formed of a screen of such mesh that the seed used would not pass therethrough. At the end of the growing period a mat of roots extends through the screen. When such is the case considerable time and effort is necessary in order to extract the culture from the seed basket. The root system extending through the mesh bottom of the basket forms a tangled mass requiring an operator to forcefully tear the mat from the basket.

In avoidance of the difficulty thus encountered, applicant has devised a system for the support of a seed bed which permits a culture readily to be extracted from the basket. Further there is provided a vehicle through which regulated quantities of food supplements may be made available to animals to which the culture is fed, as will hereinafter be explained.

Referring now to Fig. 3 there is illustrated a seed basket 50 adapted to be supported in one of the trays 10–21 of Figs. 1 and 2. In practice, several baskets such as basket 50 will be placed in each of the trays 10–21, and supported with the bottom of the baskets from one to two inches from the bottom of the associated tray. Basket 50 is provided with rigid side walls 51. Hooks 52 secured to the walls of the basket are provided conveniently to position the basket in a culture tray. Basket 50 is also provided with a bottom 53 of which mesh is extremely large compared to the size of any seed to be used therein. In a preferred form the bottom is made of the well-known expanded metal sheet having openings therein of the order of one inch in dimension.

The sheet or bottom screen 53 is securely fixed to the sides of the basket 50 as by welding or other suitable means. While any number of different sizes of mesh may be used for the bottom 53, it is necessary that only the openings be large and of such nature that the bottom 53 will cooperate with a seed supporting membrane 54 to maintain a selected posture of the seed bed. More particularly, the seed supporting membrane or pallet 54 preferably is formed of non-toxic edible cellulose perforated or slotted as indicated so that root structure may be developed therethrough, and yet be of such character that it will continue to support the seed bed through many successive cycles of immersion in a feed fluid. Various forms of paper may be utilized to provide the seed supporting mat. Either circular perforations or short slots in the mat will permit roots from the seeds to be developed, which roots will extend, not only through the paper mat 54, but through the mesh and into the lower part of the trays 10–21.

When a culture has developed to the point that it is to be fed, the basket may then be removed from the system and when held vertical or when standing on one end, the seed mat, the foliage, and the root system will then fall from the basket 50. It has been found that little or no effort is required to remove the feed mat since the screen 53 is of such large gauge. On the other hand, the supporting membrane 54 will, of course, be an integral part of the feed mass and will be consumed along with the growth portions. In one aspect of the invention, there is added to the supporting membrane food supplement elements in such form and amounts desired. However, in preferred form, the seed supporting membrane will serve only as a mechanical, but consumable vehicle for the seed bed eliminating any problem of extracting the culture from the seed basket.

Thus in accordance with the present invention there is provided a new combination of elements in a hydroponic culture system. A seed basket with substantially rigid sides and a large mesh bottom is fitted with a perforated seed supporting membrane, which membrane is characterized by being non-toxic consumable sheet having wet strength sufficient to support the seed bed on the mesh bottom.

Having explained the foregoing aspects of the invention a further modification thereof will now be described in which a continuous automatic hydroponic system is provided. More particularly referring to Figs. 4 and 5 a conveyor belt 60 comprising a plurality of links forms two continuous loops 61 and 62 along the sides thereof with a flexible connecting tray 63 extending between the loops 61 and 62. The belt 60 is carried by drums or guide wheels 64 and 65. A culture tray 10a is located intermediate the wheels 64 and 65 along the path of the belt 60. A pair of idler rolls 66 and 67 are provided adjacent wheels 64 and 65, respectively, to tension the belt 60 and to position the belt below the lip of the culture tray 10a. Tray 10a is provided with guide bars 68 and 69 which support the belt 60 as it passes through the system.

A roll of perforated paper 70 is fed into the tray 10a and is pulled therethrough as it engages the belt 60. A seed hopper 71 is located above the paper strip extending from roll 70 into tray 10a. Seed suitably soaked and germinated is supplied to the hopper and is deposited onto the membrane or sheet fed from roll 70. The links in the loops 61 and 62 are provided with upstanding interleaved plates 75 which serve to form sides for the conveyor belt 60.

With seed thus deposited onto the belt 60, continuous slow movement may be maintained to propel the seed bed along the length of the tray 10a throughout a six-day period required between deposit of a seed bed in a culture tray and the harvest thereof.

At the end of travel of a given portion of the seed bed through the tray 10a, the culture is elevated over the wheel 65 and removed slowly from the tray 10a. Due to the provision of large mesh for the bottom of the belt 60, as compared to the perforations in the membrane fed from roll 70, the seed bed, roots and foliage are separated by gravity from the belt 60 and deposited in a basket 76. A controlled irrigation system is employed periodically to inundate the seed bed on the belt 60. More particularly, a feed tank 80 is provided with an outlet valve 81 which is periodically actuated by the control means 82. A siphon 83 is provided in the tray 10a to empty the tray when a predetermined amount of fluid is deposited therein thereby to maintain the desired growing conditions in the seed bed.

It will be understood that the hopper 71 generically is representative of any system which may be utilized to deliver a seed mat to the belt 60. Another conveyor belt may, for this purpose, be employed to soak the seed in a bath for a 24 hour period and to germinate the seed for an additional 48 hours before it is placed on the belt 60. Alternatively, drive means 64a may be actuated once per day to move a given point on belt 60 a suitable distance along the growing zone and at the same time to charge the seed bed with a suitable amount of germinated seed.

In Figs. 4 and 5 a continuous automatic system is shown and operation thereof made possible and practiced by the use of a seed supporting edible membrane. It will be recognized that a batch method may also be used in an automatic system by providing culture trays with seed supporting mesh and perforated membranes forming a seed support which are moved into and out of a growing zone on a suitable conveyor system.

In each case, however, there is provided a primary seed support of mesh much larger than the seed size, together with a perforated seed supporting membrane in a hydroponic culture system which provides the desired seed bed control and at the same time permits ready extraction of the plants when desired for use.

While specific embodiments of the invention have been illustrated and described, it will be understood that other modifications may now appear to those skilled in the art and it is intended to cover such modifications as fall within the scope of the appended claims.

What is claimed is:

1. In a hydroponic culture system for controlled growth of seed, the combination of a seed basket adapted to be flooded periodically with a nutrient bearing fluid, a substantially rigid mesh bottom for said basket of mesh size much larger than that of said seed, and a perforated edible membrane within said basket supported by said mesh and characterized by perforations smaller in size than that of said seed whereby a rooting system may form through said membrane which is readily removable from said tray and said mesh.

2. The combination for controlled growth of seeds comprising a hydroponic culture tray adapted periodically to be filled with and emptied of a nutrient bearing fluid, a seed basket supported in said tray with the bottom thereof mesh-like in character with mesh size much larger than the size of said seed, and a perforated edible seed supporting membrane supported on said bottom and having perforations which are small compared to the size of said seed.

3. In a hydroponic culture system for controlled growth of seeds, the combination comprising structure forming a growing zone having sides which will retain seeds and having seed supporting means forming a bottom for said zone including a primary support of mesh structure having perforations very large compared to the size of said seeds, and an edible paper sheet overlaying said primary support having perforations of size which are small compared with the size of said seeds through which a root system may extend and above which said seeds will be maintained upon repeated inundation by a nutrient bearing fluid.

4. The combination set forth in claim 3 in which means are provided for periodically inundating said seeds with a nutrient bearing fluid.

5. The combination for controlled growth of seeds comprising a hydroponic culture zone adapted perioically to be filled with and emptied of a nutrient bearing fluid, a seed supporting unit supported in said zone having a large mesh bottom, and a sheet of paper positioned on said bottom having perforations which are small compared to the size of said seeds and through which a root system may develop whereby said root system, said paper, said seeds, and foliage may readily be removed from said unit as a unitary feed element.

6. In a hydroponic culture system for controlled growth of seeds the combination of a seed basket having sides which will retain said seeds and a bottom characterized by perforations much larger in size than the size of said seeds, an edible non-toxic cellulose sheet having perforations of size less than the size of said seeds, supported by said bottom having wet strength sufficient to support a seed bed thereon and characterized by openings therein through which roots from said seeds may extend and which membrane will prevent said seeds from passing therethrough.

7. In a hydroponic culture system for the controlled growth of seeds, the combination comprising structure forming a growing zone having sides which will retain seeds and having seed supporting means forming a bottom for said zone including a primary supporting loop of mesh structure having perforations very large compared to the size of said seed, and an edible paper sheet overlaying said primary support having perforations of size which are small compared to the size of said seeds, through which a root system may extend and above which said seeds will be maintained upon repeated inundation by a nutrient bearing fluid, and means for driving said loop with said paper sheet through said zone.

References Cited in the file of this patent

UNITED STATES PATENTS

| 679,124 | Von der Kammer | July 23, 1901 |
| 776,139 | Luebben | Nov. 29, 1904 |
| 1,094,813 | Reynolds | Apr. 28, 1914 |
| 1,793,626 | McCormick | Feb. 24, 1931 |
| 1,915,884 | Gericke | June 27, 1933 |
| 2,040,161 | Widmann | May 12, 1936 |
| 2,358,000 | Cornell | Sept. 12, 1944 |
| 2,648,165 | Nestor | Aug. 11, 1953 |
| 2,909,003 | Marshall | Oct. 20, 1959 |

FOREIGN PATENTS

| 1,087,158 | France | Aug. 18, 1954 |
| 5,799 | Great Britain | of 1882 |

OTHER REFERENCES

Musil: "Testing Farm Seeds in Home and School," published March 1942 by U.S. Department of Agriculture as its Miscellaneous Publication No. 437, pages 1 through 14 are relied on.

Ellis et al.: "Soilless Growth of Plants," second edition, published 1947 by Reinhold (N.Y.), pages 55, 56, 57, 58, 59 and 60 are relied on.